US011634163B2

(12) United States Patent
Wang et al.

(10) Patent No.: US 11,634,163 B2
(45) Date of Patent: Apr. 25, 2023

(54) PRODUCING, FOR AN AUTONOMOUS VEHICLE, A ROUTE FROM AN ORIGINATION TO A DESTINATION

(71) Applicant: Toyota Motor Engineering & Manufacturing North America, Inc., Plano, TX (US)

(72) Inventors: Ziran Wang, San Jose, CA (US); Kyungtae Han, Palo Alto, CA (US); Prashant Tiwari, Santa Clara, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 58 days.

(21) Appl. No.: 17/168,582

(22) Filed: Feb. 5, 2021

(65) Prior Publication Data

US 2022/0144311 A1 May 12, 2022

Related U.S. Application Data

(60) Provisional application No. 63/111,142, filed on Nov. 9, 2020.

(51) Int. Cl.
 *B60W 60/00* (2020.01)
 *G08G 1/16* (2006.01)
 (Continued)

(52) U.S. Cl.
 CPC .... *B60W 60/0053* (2020.02); *B60W 60/0015* (2020.02); *G05D 1/0061* (2013.01);
 (Continued)

(58) Field of Classification Search
 CPC ......... B60W 60/0053; B60W 60/0015; B60W 2556/10; B60W 2556/45; B60W 60/00;
 (Continued)

(56) References Cited

U.S. PATENT DOCUMENTS 8,121,749 B1 2/2012 Agrawal et al.
8,676,431 B1 * 3/2014 Mariet ................. G08G 1/0962
701/28
(Continued)

OTHER PUBLICATIONS

Jeff McMahon, "Big Fuel Savings From Autonomous Vehicles," Green Tech, pp. 1-4, Apr. 17, 2017.
(Continued)

*Primary Examiner* — Rodney A Butler
(74) *Attorney, Agent, or Firm* — Christopher G. Darrow; Darrow Mustafa PC

(57) ABSTRACT

Candidate routes, from an origination to a destination, can be produced. Information can be obtained. The information can be of likelihoods of encounters, along the candidate routes, with types of driving situations demonstrated to cause changes in a degree of confidence, of an occupant of an autonomous vehicle, that a controller of the autonomous vehicle will be able to control the autonomous vehicle so that a result of the encounters is not a collision. Take-over probabilities can be obtained. The take-over probabilities can be of likelihoods that the occupant, in response to the encounters, will cause control of the autonomous vehicle to be transferred to the occupant. Based on the information and take-over probabilities, a route from the origination to the destination can be selected from the candidate routes. The autonomous vehicle can be caused to be configured to commence to move in a direction in accordance with the route.

20 Claims, 4 Drawing Sheets

(51) Int. Cl.
  *G05D 1/02* (2020.01)
  *G05D 1/00* (2006.01)
(52) U.S. Cl.
  CPC ......... *G05D 1/0214* (2013.01); *G05D 1/0276* (2013.01); *G08G 1/16* (2013.01); *B60W 2556/10* (2020.02); *B60W 2556/45* (2020.02)
(58) Field of Classification Search
  CPC ............... G05D 1/0061; G05D 1/0214; G05D 1/0276; G08G 1/16
  See application file for complete search history.

(56) References Cited

U.S. PATENT DOCUMENTS

| | | | |
|---|---|---|---|
| 8,751,077 | B2 | 6/2014 | Hiruta et al. |
| 9,465,388 | B1* | 10/2016 | Fairfield .............. G05D 1/0044 |
| 10,372,130 | B1 | 8/2019 | Kaushansky et al. |
| 2018/0329428 | A1 | 11/2018 | Nagy et al. |
| 2019/0101985 | A1 | 4/2019 | Sajda et al. |
| 2019/0113353 | A1 | 4/2019 | Shimizu et al. |
| 2019/0310627 | A1 | 10/2019 | Halder |
| 2019/0332113 | A1* | 10/2019 | Mangal .............. G01C 21/3461 |

OTHER PUBLICATIONS

Revell et al., "That was scary . . . exploring driver-autonomous vehicle interaction using the Perceptual Cycle Model," Contemporary Ergonomics and Human Factors, pp. 1-7, Oct. 23, 2018.
McCall et al., "Towards A Taxonomy of Autonomous Vehicle Handover Situations," Proceedings of the 8th International Conference on Automotive User Interfaces and Interactive Vehicular Applications, pp. 193-200, Oct. 2016.
Chen Lv et al., "Analysis of Autopilot Disengagements Occurring During Autonomous Vehicle Testing," IEEE/CAA Journal of Automatica Sinica, vol. 5, No. 1, pp. 58-68, Jan. 2018.
Morra et al., "Building Trust in Autonomous Vehicles: Role of Virtual Reality Driving Simulators in HMI Design," IEEE Transactions on Vehicular Technology, vol. 68, No. 10, pp. 9438-9450, Oct. 2019.
Arslanyilmaz et al., "Driver Readiness in Autonomous Vehicle Take-Overs," International Journal of Transport and Vehicle Engineering, vol. 14, No. 8, pp. 558-563, 2020.
Dillen et al., "Keep Calm and Ride Along: Passenger Comfort and Anxiety as Physiological Responses to Autonomous Driving Styles," Proceedings of the 2020 CHI Conference on Human Factors in Computing Systems, pp. 1-13, Apr. 2020, Honolulu, HI, USA.

* cited by examiner

PRODUCING, FOR AN AUTONOMOUS VEHICLE, A ROUTE FROM AN ORIGINATION TO A DESTINATION

CROSS-REFERENCE TO RELATED APPLICATIONS

This application claims the benefit of U.S. Provisional Application No. 63/111,142, filed Nov. 9, 2020, which is incorporated herein in its entirety by reference.

TECHNICAL FIELD

The disclosed technologies are directed to producing, for an autonomous vehicle, a route from an origination to a destination that takes into consideration an encounter, along the route, with a type of driving situation demonstrated to cause a change in a degree of confidence, of an occupant of the autonomous vehicle, that a controller of the autonomous vehicle will be able to control the autonomous vehicle so that a result of the encounter is not a collision.

BACKGROUND

The Society of Automotive Engineers (SAE) International has specified various levels of driving automation. Specifically, Standard J3016, Taxonomy and Definitions for Terms Related to Driving Automation Systems for On-Road Motor Vehicles, issued by the SAE International on Jan. 16, 2014, and most recently revised on Jun. 15, 2018, defines six levels of driving automation. These six levels include: (1) level 0, no automation, in which all aspects of dynamic driving tasks are performed by a human driver; (2) level 1, driver assistance, in which a driver assistance system, if selected, can execute, using information about the driving environment, either steering or acceleration/deceleration tasks, but all remaining driving dynamic tasks are performed by a human driver; (3) level 2, partial automation, in which one or more driver assistance systems, if selected, can execute, using information about the driving environment, both steering and acceleration/deceleration tasks, but all remaining driving dynamic tasks are performed by a human driver; (4) level 3, conditional automation, in which an automated driving system, if selected, can execute all aspects of dynamic driving tasks with an expectation that a human driver will respond appropriately to a request to intervene; (5) level 4, high automation, in which an automated driving system, if selected, can execute all aspects of dynamic driving tasks even if a human driver does not respond appropriately to a request to intervene; and (6) level 5, full automation, in which an automated driving system can execute all aspects of dynamic driving tasks under all roadway and environmental conditions that can be managed by a human driver.

SUMMARY

In an embodiment, a system for producing, for an autonomous vehicle, a route from an origination to a destination can include one or more processors, a data store, and a memory. The data store can be communicably coupled to the one or more processors. The data store can be configured to store information and take-over probabilities. The memory can be communicably coupled to the one or more processors. The memory can store a candidate route producing module, a route information module, an occupant information module, a route selection module, and an actuation module. The candidate route producing module can include instructions that when executed by the one or more processors cause the one or more processors to produce candidate routes from the origination to the destination. The route information module can include instructions that when executed by the one or more processors cause the one or more processors to obtain the information. The information can be of likelihoods of encounters, along the candidate routes, with types of driving situations demonstrated to cause changes in a degree of confidence, of an occupant of the autonomous vehicle, that a controller of the autonomous vehicle will be able to control the autonomous vehicle so that a result of the encounters is not a collision. The occupant information module can include instructions that when executed by the one or more processors cause the one or more processors to obtain the take-over probabilities. The take-over probabilities can be of likelihoods that the occupant, in response to the encounters, will cause control of the autonomous vehicle to be transferred to the occupant. The route selection module can include instructions that when executed by the one or more processors cause the one or more processors to select, based on the information and the take-over probabilities, and from the candidate routes, the route from the origination to the destination. The actuation module can include instructions that when executed by the one or more processors cause the autonomous vehicle to be configured to commence to move in a direction in accordance with the route.

In another embodiment, a method for producing, for an autonomous vehicle, a route from an origination to a destination can include producing, by a processor, candidate routes from the origination to the destination. The method can include obtaining, by the processor, information. The information can be of likelihoods of encounters, along the candidate routes, with types of driving situations demonstrated to cause changes in a degree of confidence, of an occupant of the autonomous vehicle, that a controller of the autonomous vehicle will be able to control the autonomous vehicle so that a result of the encounters is not a collision. The method can include obtaining, by the processor, take-over probabilities. The take-over probabilities can be of likelihoods that the occupant, in response to the encounters, will cause control of the autonomous vehicle to be transferred to the occupant. The method can include selecting, by the processor, based on the information and the take-over probabilities, and from the candidate routes, the route from the origination to the destination. The method can include causing, by the processor, the autonomous vehicle to be configured to commence to move in a direction in accordance with the route.

In another embodiment, a non-transitory computer-readable medium for producing, for an autonomous vehicle, a route from an origination to a destination can include instructions that when executed by one or more processors cause the one or more processors to produce candidate routes from the origination to the destination. The non-transitory computer-readable medium can include instructions that when executed by the one or more processors cause the one or more processors to obtain information. The information can be of likelihoods of encounters, along the candidate routes, with types of driving situations demonstrated to cause changes in a degree of confidence, of an occupant of the autonomous vehicle, that a controller of the autonomous vehicle will be able to control the autonomous vehicle so that a result of the encounters is not a collision. The non-transitory computer-readable medium can include instructions that when executed by the one or more processors cause the one or more processors to obtain take-over probabilities. The take-over probabilities can be of likelihoods that the occupant, in response to the encounters, will cause control of the autonomous vehicle to be transferred to the occupant. The non-transitory computer-readable medium can include instructions that when executed by the one or more processors cause the one or more processors to select, based on the information and the take-over probabilities, and from the candidate routes, the route from the origination to the destination. The non-transitory computer-readable medium can include instructions that when executed by the one or more processors cause the one or more processors to cause the autonomous vehicle to be configured to commence to move in a direction in accordance with the route.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

It is estimated that by 2050 that autonomous vehicles may reduce consumption of fuel by passenger vehicles by 44 percent, and by trucks by 18 percent. However, in addition to the technical challenges presented by efforts to automate driving there can be challenges with efforts to maintain a high degree of confidence, of an occupant of an autonomous vehicle, during an encounter, along a route from an origination to a destination, with a type of driving situation demonstrated to cause a change in a degree of confidence, of the occupant, that a controller of the autonomous vehicle will be able to control the autonomous vehicle so that a result of the encounter is not a collision. Such an encounter can include, for example, a pedestrian in a lane of the autonomous vehicle, an obstacle in the lane of the autonomous vehicle, another vehicle being in a lane for a movement in an opposite direction of the direction of the lane of the autonomous vehicle, or the like. For example, the other vehicle can have a weight that is a multiple of at least ten times a weight of the autonomous vehicle. In response to such an encounter, the occupant may cause control of the autonomous vehicle to be transferred to the occupant. Such a transfer of control can undermine the advantage in reduced consumption of fuel intended to be realized by the development of autonomous vehicles.

The disclosed technologies can be used to produce, for an autonomous vehicle, a route from an origination to a destination. Candidate routes, from the origination to the destination, can be produced. Information can be obtained. The information can be of likelihoods of encounters, along the candidate routes, with types of driving situations demonstrated to cause changes in a degree of confidence, of an occupant of the autonomous vehicle, that a controller of the autonomous vehicle will be able to control the autonomous vehicle so that a result of the encounters is not a collision. Take-over probabilities can be obtained. The take-over probabilities can be of likelihoods that the occupant, in response to the encounters, will cause control of the autonomous vehicle to be transferred to the occupant. Based on the information and the take-over probabilities, the route from the origination to the destination can be selected from the candidate routes. For example, the route can be a candidate route that, based on likelihoods of encounters with types of driving situations and likelihoods that the occupant, in response to the encounters, will cause control of the autonomous vehicle to be transferred to the occupant, can be least likely, from among the candidate routes, to cause the occupant to cause control of the autonomous vehicle to be transferred to the occupant. The autonomous vehicle can be caused to be configured to commence to move in a direction in accordance with the route.

Figure 1:
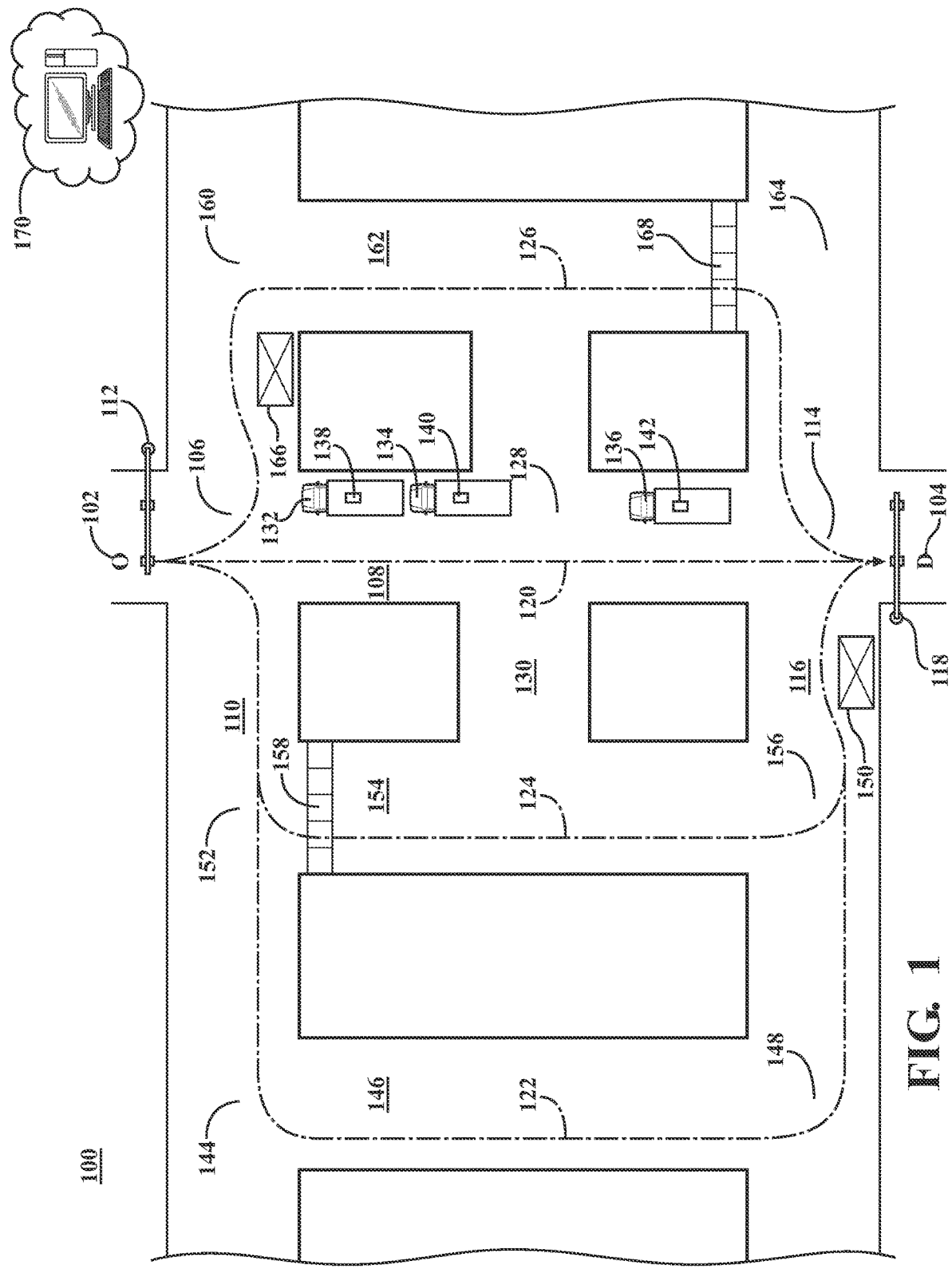
FIG. 1 is a diagram that includes an example of an environment for producing, for an autonomous vehicle, a route from an origination to a destination, according to the disclosed technologies.

FIG. 1 is a diagram that includes an example of an environment 100 for producing, for an autonomous vehicle, a route from an origination 102 to a destination 104, according to the disclosed technologies. The origination 102 can be, for example, at a first intersection 106 of a first road 108 with a second road 110. For example, a first roadside infrastructure unit 112 (e.g., a stoplight with a wireless communications device) can be located at the first intersection 106. The destination 104 can be, for example, at a second intersection 114 of the first road 108 with a third road 116. For example, a second roadside infrastructure unit 118 (e.g., a stoplight with a wireless communications device) can be located at the second intersection 114. The environment 100 can include candidate routes from the origination 102 to the destination 104. The candidate routes can include, for example, a first candidate route 120, a second candidate route 122, a third candidate route 124, and a fourth candidate route 126.

The first candidate route 120 can be from the origination 102 to the destination 104 along the first road 108 via a third intersection 128 of the first road 108 with a fourth road 130. For example, along the first candidate route 120, in a lane for a movement in an opposite direction of a direction of a lane of the autonomous vehicle, there can be three other vehicles: a first vehicle 132, a second vehicle 134, and a third vehicle 136. For example, one or more of the other vehicles can have a weight that is a multiple of at least ten times a weight of the autonomous vehicle. For example, the first vehicle 132 can have a first wireless communications device 138, the second vehicle 134 can have a second wireless communications device 140, and the third vehicle 136 can have a third wireless communications device 142.

The second candidate route 122 can be from the origination 102 to the destination 104 along the second road 110 to a fourth intersection 144 of the second road 110 with a fifth road 146, along the fifth road 146 to a fifth intersection 148 of the fifth road 146 with the third road 116, and along the third road 116. For example, along the second candidate route 122 there can be a first obstacle 150 in the lane of the autonomous vehicle.

The third candidate route 124 can be from the origination 102 to the destination 104 along the second road 110 to a sixth intersection 152 of the second road 110 with a sixth road 154, along the sixth road 154 to a seventh intersection 156 of the sixth road 154 with the third road 116, and along the third road 116. For example, along the third candidate route 124 there can be a first crosswalk 158 in the lane of the autonomous vehicle, and the first obstacle 150 in the lane of the autonomous vehicle. For example, a location of the first crosswalk 158 can be nearer to the origination 102, along the third candidate route 124, than a location of the first obstacle 150.

The fourth candidate route 126 can be from the origination 102 to the destination 104 along the second road 110 to an eighth intersection 160 of the second road 110 with a seventh road 162, along the seventh road 162 to a ninth intersection 164 of the seventh road 162 with the third road 116, and along the third road 116. For example, along the fourth candidate route 126 there can be a second obstacle 166 in the lane of the autonomous vehicle, and a second crosswalk 168 in the lane of the autonomous vehicle. For example, a location of the second obstacle 166 can be nearer to the origination 102, along the fourth candidate route 126, than a location of the second crosswalk 168.

For example, the environment 100 can include a cloud computing platform 170.

Figure 2:
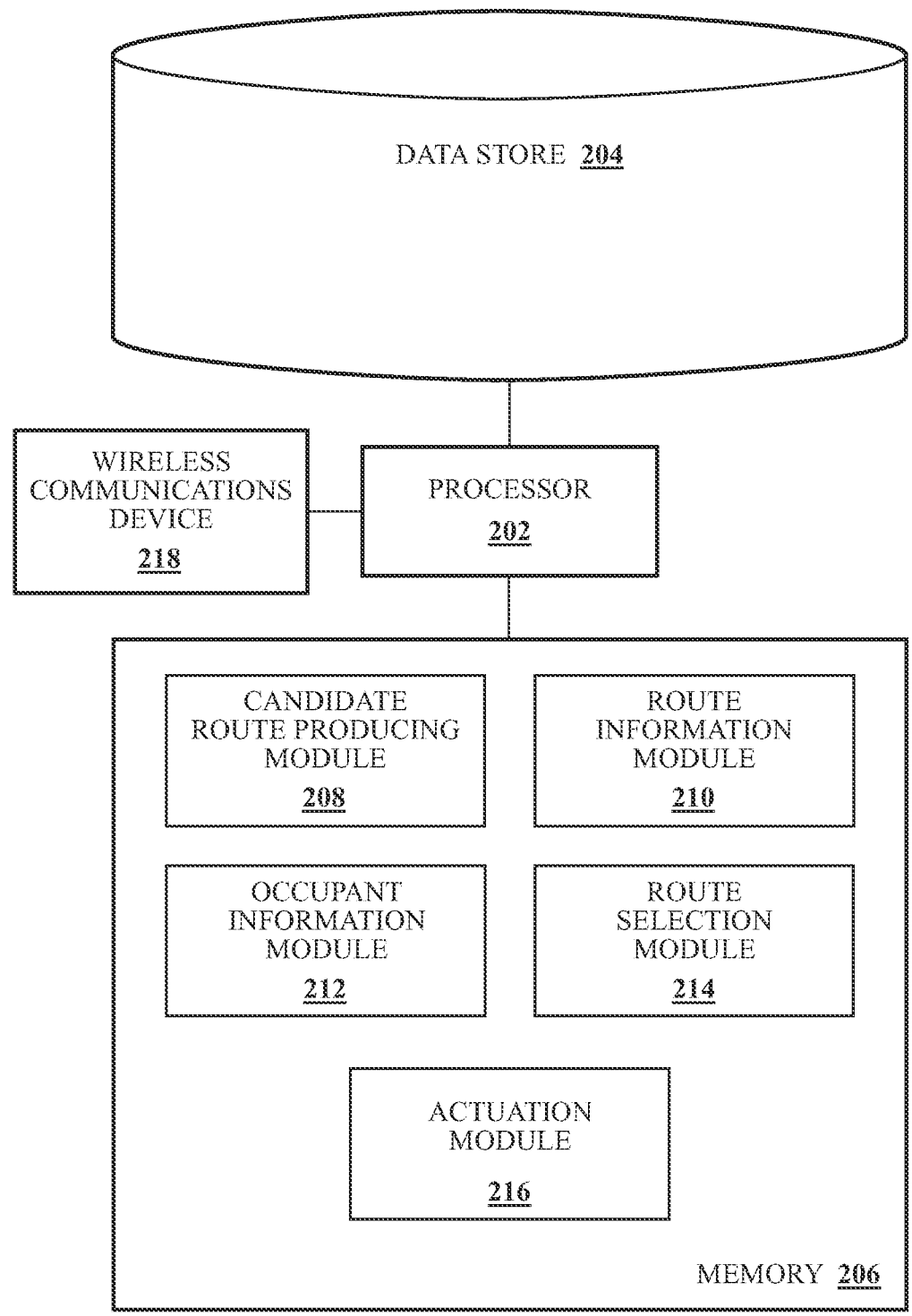
FIG. 2 is a block diagram that illustrates an example of a system for producing, for the autonomous vehicle, the route from the origination to the destination, according to the disclosed technologies.

FIG. 2 is a block diagram that illustrates an example of a system 200 for producing, for an autonomous vehicle, a route from an origination to a destination, according to the disclosed technologies. The system 200 can include, for example, a processor 202, a data store 204, and a memory 206. The data store 204 can be communicably coupled to the processor 202. For example, the data store 204 can be configured to store information and take-over probabilities. The memory 206 can be communicably coupled to the processor 202. For example, the memory 206 can store a candidate route producing module 208, a route information module 210, an occupant information module 212, a route selection module 214, and an actuation module 216.

The candidate route producing module 208 can include instructions that function to control the processor 202 to produce candidate routes from the origination to the destination. For example, with reference to FIG. 1, the candidate routes can include the first candidate route 120, the second candidate route 122, the third candidate route 124, and the fourth candidate route 126. For example, the instructions to produce the candidate routes can include instructions that function to control the processor 202 to produce the candidate routes so that a prospective candidate route is included in the candidate routes based on an ability of the autonomous vehicle to travel from the origination to the destination within a threshold duration of time. For example, if the second candidate route 122 is a prospective candidate route, but the autonomous vehicle cannot travel from the origination to the destination along the second candidate route 122 within a threshold duration of time, then the second candidate route 122 may not be included in the candidate routes.

Returning to FIG. 2, the route information module 210 can include instructions that function to control the processor 202 to obtain the information. The information can be of likelihoods of encounters, along the candidate routes, with types of driving situations demonstrated to cause changes in a degree of confidence, of an occupant of the autonomous vehicle, that a controller of the autonomous vehicle will be able to control the autonomous vehicle so that a result of the encounters is not a collision. For example, a type of driving situation, of the types of driving situations, can include a pedestrian in a lane of the autonomous vehicle, an obstacle in the lane of the autonomous vehicle, another vehicle being in a lane for a movement in an opposite direction of the direction of the lane of the autonomous vehicle, or the like. For example, the other vehicle can have a weight that is a multiple of at least ten times a weight of the autonomous vehicle. For example, the other vehicle can be a semi-tractor-trailer truck.

In a first implementation, the system 200 can further include a wireless communications device 218. The wireless communications device 218 can be communicably coupled to the processor 202. The instructions to obtain the information can include instructions that function to control the processor 202 to receive, via the wireless communications device 218, the information. For example, the instructions to receive the information can include instructions that function to control the processor 202 to receive the information from one or more of another vehicle, a cloud computing platform, a roadside infrastructure unit, or the like.

For example, with reference to FIG. 1: (1) one or more locations of one or more of the first vehicle 132, the second vehicle 134, or the third vehicle 136 can be received from one or more of the first wireless communications device 138, the second wireless communications device 140, the third wireless communications device 142, or the cloud computing platform 170, (2) one or more locations of the first obstacle 150 or the second obstacle 166 can be received from one or more of the first roadside infrastructure unit 112 (e.g., the stoplight with the wireless communications device), the second roadside infrastructure unit 118 (e.g., the stoplight with the wireless communications device), or the cloud computing platform 170, and (3) one or more locations of the first crosswalk 158 or the second crosswalk 168 can be received from the cloud computing platform 170.

Returning to FIG. 2, in a second implementation, the instructions to obtain the information can include instructions that function to control the processor 202 to determine the information. The information can be encounter probabilities.

For example, with reference to FIG. 1: (1) an item of information (e.g., an encounter probability) for one of the first vehicle 132, the second vehicle 134, or the third vehicle 136 can be 90 percent, (2) an item of information (e.g., an encounter probability) for one of the first obstacle 150 or the second obstacle 166 can be 100 percent, and (3) an item of information (e.g., an encounter probability) for one or more encounters with one or more pedestrians at the first crosswalk 158 or the second crosswalk 168 can be 90 percent.

Returning to FIG. 2, the occupant information module 212 can include instructions that function to control the processor 202 to obtain the take-over probabilities. The take-over probabilities can be of likelihoods that the occupant, in response to the encounters, will cause control of the autonomous vehicle to be transferred to the occupant. For example, the instructions to obtain the take-over probabilities can include instructions that function to control the processor 202 to determine the take-over probabilities from information produced from an analysis of historical data associated with previous encounters with the types of driving situations. For example, the historical data can be associated with one or more of a set of occupants or a set of autonomous vehicles.

For example, with reference to FIG. 1: (1) a takeover probability for an encounter with one of the first vehicle 132, the second vehicle 134, or the third vehicle 136 can be 20 percent, (2) a takeover probability for an encounter with one of the first obstacle 150 or the second obstacle 166 can be 25 percent, and (3) a takeover probability for an encounter with one or more pedestrians at the first crosswalk 158 or the second crosswalk 168 can be 30 percent.

Returning to FIG. 2, the route selection module 214 can include instructions that function to control the processor 202 to select, based on the information and the take-over probabilities, and from the candidate routes, the route from the origination to the destination.

For example, with reference to FIG. 1, if the second candidate route 122 is not included in the candidate routes, then, based on the information and the take-over probabilities: (1) the first candidate route 120 can have a likelihood of 54 percent ([(0.90)(0.20)+(0.90)(0.20)+(0.90)(0.20)]) to cause the occupant to cause control of the autonomous vehicle to be transferred to the occupant, (2) the third candidate route 124 can have a likelihood of 52 percent ([(0.90)(0.30)+(1.00)(0.25)]) to cause the occupant to cause control of the autonomous vehicle to be transferred to the occupant, and (3) the fourth candidate route 126 can have a likelihood of 52 percent ([(1.00)(0.25)+(0.90)(0.30)]) to cause the occupant to cause control of the autonomous vehicle to be transferred to the occupant. Based on this data, the route selection module 214 can select the third candidate route 124 or the fourth candidate route 126 as the route from the origination to the destination because the third candidate route 124 or the fourth candidate route 126 can be least likely, from among the candidate routes, to cause the occupant to cause control of the autonomous vehicle to be transferred to the occupant.

Returning to FIG. 2, the actuation module 216 can include instructions that function to control the processor 202 to cause the autonomous vehicle to be configured to commence to move in a direction in accordance with the route. For example, the instructions to cause the autonomous vehicle to be configured to commence to move in the direction in accordance with the route can include instructions that function to control the processor 202 to cause the autonomous vehicle to commence to move in the direction in accordance with the route.

In a third implementation, the data store 204 can be further configured to store situation weights. The route information module 210 can further include instructions that function to control the processor 202 to obtain the situation weights. A type of driving situation, of the types of driving situations, can be associated with a corresponding situation weight of the situation weights. The corresponding situation weight can be a measure of a likelihood that an encounter with the type of driving situation will result in the collision and a severity of a consequence in response to the encounter being the collision. The instructions to select the route, included in the route selection module 214, can include instructions that function to control the processor 202 to select the route further based on the situation weights.

For example, with reference to FIG. 1: (1) although a severity of a consequence in response to an encounter with one of the first vehicle 132, the second vehicle 134, or the third vehicle 136 being a collision can be high, because a likelihood that such an encounter will result in a collision can be low (i.e., the first vehicle 132, the second vehicle 134, and the third vehicle 136 are in a lane for a movement in an opposite direction of a direction of a lane of the autonomous vehicle), a corresponding situation weight for an encounter with one of the first vehicle 132, the second vehicle 134, or the third vehicle 136 can be 1.0, (2) because a severity of a consequence in response to an encounter with one of the first obstacle 150 or the second obstacle 166 being a collision can be moderate and a likelihood that such an encounter will result in a collision can be moderate, a corresponding situation weight for an encounter with one of the first obstacle 150 or the second obstacle 166 can be 2.0, and (3) because a severity of a consequence in response to an encounter with one or more pedestrians at the first crosswalk 158 or the second crosswalk 168 being a collision can be high and a likelihood that such an encounter will result in a collision can be moderate, a corresponding situation weight for an encounter with one or more pedestrians at the first crosswalk 158 or the second crosswalk 168 can be 3.0.

If the second candidate route 122 is not included in the candidate routes, then, based on the information, the take-over probabilities, and the situation weights: (1) the first candidate route 120 can have a score of 54 ([0.90)(0.20) (1.0)+(0.90)(0.20)(1.0)+(0.90)(0.20)(1.0)]) with respect to causing the occupant to cause control of the autonomous vehicle to be transferred to the occupant, (2) the third candidate route 124 can have a score of 131 ([(0.90)(0.30) (3.0)+(1.00)(0.25)(2.0)]) with respect to causing the occupant to cause control of the autonomous vehicle to be transferred to the occupant, and (3) the fourth candidate route 126 can have a score of 131 ([(1.00)(0.25)(2.0)+(0.90) (0.30)(3.0)]) with respect to causing the occupant to cause control of the autonomous vehicle to be transferred to the occupant. Based on this data, the route selection module 214 can select the first candidate route 122 as the route from the origination to the destination because the first candidate route 122 can be least likely, from among the candidate routes, to cause the occupant to cause control of the autonomous vehicle to be transferred to the occupant.

Returning to FIG. 2, in a fourth implementation, the data store 204 can be further configured to store a confidence weight. The occupant information module 212 can further include instructions that function to control the processor 202 to obtain the confidence weight. The occupant can be associated with the confidence weight. For example, the instructions to obtain the confidence weight can include instructions that function to control the processor 202 to obtain the confidence weight from information produced from an analysis of historical data associated with previous encounters, by the occupant, with the types of driving situations. For example, if the information produced from the analysis of the historical data associated with the previous encounters, by the occupant, with the types of driving situations indicates that the occupant has: (1) an average degree of confidence, then the confidence weight can be 1.0, (2) an above average degree of confidence, then the confidence weight can be 0.9, and (3) a below average degree of confidence, then the confidence weight can be 1.1.

The take-over probabilities can be based on the confidence weight. For example, with reference to FIG. 1, if the occupant has a below average degree of confidence, then: (1) a takeover probability for an encounter with one of the first vehicle 132, the second vehicle 134, or the third vehicle 136 can be 22.0 percent ((0.20)(1.10)), (2) a takeover probability for an encounter with one of the first obstacle 150 or the second obstacle 166 can be 27.5 percent ((0.25)(1.10)), and (3) a takeover probability for an encounter with one or more pedestrians at the first crosswalk 158 or the second crosswalk 168 can be 33.0 percent ((0.30)(1.10)).

Returning to FIG. 2, in a fifth implementation, the data store 204 can be further configured to store an initial confidence factor. The occupant information module 212 can further include instructions that function to control the processor 202 to obtain the initial confidence factor. The initial confidence factor can be a measure of the degree of confidence of the occupant prior to a commencement of a movement of the autonomous vehicle from the origination. For example, the instructions to obtain the initial confidence factor can include instructions that function to control the processor 202 to obtain the initial confidence factor from one or more of: (1) information produced from processing an image of the occupant prior to the commencement of the movement of the autonomous vehicle from the origination, (2) information produced from an analysis of historical data associated with a count of a number of instances in which the occupant, in response to previous encounters with driving situations, caused control of the autonomous vehicle to be transferred to the occupant, (3) information produced from the analysis of the historical data between a time of the commencement of the movement of the autonomous vehicle from the origination and a threshold duration of time prior to the commencement of the movement of the autonomous vehicle from the origination, (4) information input, by the occupant, into an interface communicably coupled to the processor, or (5) the like. For example, if the measure of the degree of confidence of the occupant prior to the commencement of the movement of the autonomous vehicle from the origination indicates that the occupant has: (1) an average degree of confidence, then the initial confidence factor can be 0.0, (2) an above average degree of confidence, then the initial confidence factor can be −0.05, and (3) a below average degree of confidence, then the initial confidence factor can be +0.05.

The take-over probabilities can be based on the initial confidence factor. For example, with reference to FIG. 1, if the occupant has a below average degree of confidence, then: (1) a takeover probability for an encounter with one of the first vehicle 132, the second vehicle 134, or the third vehicle 136 can be 25 percent (0.20+0.05), (2) a takeover probability for an encounter with one of the first obstacle 150 or the second obstacle 166 can be 30 percent (0.25+0.05), and (3) a takeover probability for an encounter with one or more pedestrians at the first crosswalk 158 or the second crosswalk 168 can be 35 percent (0.30+0.05).

In a sixth implementation, the information can include a first item of information and a second item of information, and the types of driving situations can include a first type of driving situation and a second type of driving situation. The first item of information can be of a likelihood of an encounter with the first type of driving situation, and the second item of information can be of a likelihood of an encounter with the second type of driving situation. The take-over probabilities can include a first take-over probability and a second take-over probability. The first take-over probability can be of a likelihood that the occupant, in response to the encounter with the first type of driving situation, will cause control of the autonomous vehicle to be transferred to the occupant. The second take-over probability can be of a likelihood that the occupant, in response to the encounter with the second type of driving situation, will cause control of the autonomous vehicle to be transferred to the occupant. The instructions to select the route can include instructions that function to control the processor 202 to select the route based on a sum of a first product added to a second product. The first product can be of the first item of information multiplied by the first take-over probability, and the second product can be of the second item of information multiplied by the second take-over probability.

For example, if the second candidate route 122 is not included in the candidate routes, then: (1) a sum for the first candidate route 120 can be of a first product added to a second product added to a third product, (2) a sum for the third candidate route 124 can be of a first product added to a second product, and (3) a sum for the fourth candidate route 126 can be of a first product added to a second product.

For the first candidate route 120, the first product can be of the first item of information (e.g., an encounter probability with the first vehicle 132 (e.g., 90 percent)) multiplied by the first take-over probability (e.g., for an encounter with the first vehicle 132 (e.g., 20 percent)), the second product can be of the second item of information (e.g., an encounter probability with the second vehicle 134 (e.g., 90 percent)) multiplied by the second take-over probability (e.g., for an encounter with the second vehicle 134 (e.g., 20 percent)), and the third product can be of the third item of information (e.g., an encounter probability with the third vehicle 136 (e.g., 90 percent)) multiplied by the third take-over probability (e.g., for an encounter with the third vehicle 136 (e.g., 20 percent)). Thus, for the first candidate route 120 the sum can be 54 percent.

For the third candidate route 124, the first product can be of the first item of information (e.g., an encounter probability with the first crosswalk 158 (e.g., 90 percent)) multiplied by the first take-over probability (e.g., for an encounter with the first crosswalk 158 (e.g., 30 percent)) and the second product can be of the second item of information (e.g., an encounter probability with the first obstacle 150 (e.g., 100 percent)) multiplied by the second take-over probability (e.g., for an encounter with the first obstacle 150 (e.g., 25 percent)). Thus, for the third candidate route 124 the sum can be 52 percent.

For the fourth candidate route 126, the first product can be of the first item of information (e.g., an encounter probability with the second obstacle 166 (e.g., 100 percent)) multiplied by the first take-over probability (e.g., for an encounter with the second obstacle 166 (e.g., 25 percent)) and the second product can be of the second item of information (e.g., an encounter probability with the second crosswalk 168 (e.g., 90 percent)) multiplied by the second take-over probability (e.g., for an encounter with the second crosswalk 168 (e.g., 30 percent)). Thus, for the fourth candidate route 126 the sum can be 52 percent.

Based on this data, the route selection module 214 can select the third candidate route 124 or the fourth candidate route 126 as the route from the origination to the destination because the third candidate route 124 or the fourth candidate route 126 can be least likely, from among the candidate routes, to cause the occupant to cause control of the autonomous vehicle to be transferred to the occupant.

In a specific realization of the sixth implementation, the first item of information can include information about a location of the first type of driving situation, and the second item of information can include information about a location of the second type of driving situation. Along a corresponding candidate route, of the candidate routes, the location of the first type of driving situation can be nearer to the origination than the location of the second type of driving situation. The second take-over probability can be a function of a sum of the encounters, along the corresponding candidate route, with the types of driving situations.

For example, a take-over probability at a current location can be a product of a nominal take-over probability of the current location multiplied by a base value (e.g., 1.1) raised to a power of an exponent. For example, the exponent can be a sum of the encounters, along the corresponding candidate route, with the types of driving situations. For example, for the first candidate route 120, the first take-over probability can be 20.0 percent (i.e., 20.0[(1.1^0]), the second take-over probability can be 22.0 percent (i.e., 20.0[(1.1^1]), and the third take-over probability can be 24.2 percent (i.e., 20.0[(1.1^2]). Thus, for the first candidate route 120 the sum can be 59.58 percent. For example, for the third candidate route 124, the first take-over probability can be 30.0 percent (i.e., 30.0[(1.1^0]) and the second take-over probability can be 27.5 percent (i.e., 25.0[(1.1^1]). Thus, for the third candidate route 124 the sum can be 54.50 percent. For example, for the fourth candidate route 126, the first take-over probability can be 25.0 percent (i.e., 25.0[(1.1^0]) and the second take-over probability can be 33.0 percent (i.e., 30.0[(1.1^1]). Thus, for the fourth candidate route 126 the sum can be 54.70 percent. Based on this data, the route selection module 214 can select the third candidate route 124 as the route from the origination to the destination because the third candidate route 124 can be least likely, from among the candidate routes, to cause the occupant to cause control of the autonomous vehicle to be transferred to the occupant.

Returning to FIG. 2, in a variation of the specific realization of the sixth implementation, the data store 204 can be further configured to store an initial confidence factor. The occupant information module 212 can further include instructions that function to control the processor 202 to obtain the initial confidence factor. The initial confidence factor can be a measure of the degree of confidence of the occupant prior to a commencement of a movement of the autonomous vehicle from the origination.

The take-over probabilities can be based on the initial confidence factor. For example, if the occupant has a below average degree of confidence (e.g., the initial confidence factor is +0.5), then: (1) for the first candidate route 120, the first take-over probability can be 25.00 percent (i.e., [20.0+5.0][(1.1)^0]), the second take-over probability can be 27.50 percent (i.e., [20.0+5.0][(1.1^1]), and the third take-over probability can be 30.25 percent (i.e., [20.0+5.0][(1.1^2]). Thus, for the first candidate route 120 the sum can be 74.475 percent. For example, for the third candidate route 124, the first take-over probability can be 35.00 percent (i.e., [30.0+5.0][(1.1^0]) and the second take-over probability can be 33.00 percent (i.e., [25.0+5.0][(1.1^1]). Thus, for the third candidate route 124 the sum can be 64.500 percent. For example, for the fourth candidate route 126, the first take-over probability can be 30.00 percent (i.e., [25.0+5.0][(1.1^0]) and the second take-over probability can be 38.5 percent (i.e., [30.0+5.0][(1.1^1]). Thus, for the fourth candidate route 126 the sum can be 64.650 percent. Based on this data, the route selection module 214 can select the third candidate route 124 as the route from the origination to the destination because the third candidate route 124 can be least likely, from among the candidate routes, to cause the occupant to cause control of the autonomous vehicle to be transferred to the occupant.

In an adaptation of the variation of the specific realization of the sixth implementation, the data store 204 can be further configured to store a confidence weight. The occupant information module 212 can further include instructions that function to control the processor 202 to obtain the confidence weight. The occupant can be associated with the confidence weight.

The take-over probabilities can be based on the confidence weight. For example, if the occupant has a below average degree of confidence (e.g., the confidence weight is 1.10), then: (1) for the first candidate route 120, the first take-over probability can be 27.500 percent (i.e., [20.0+5.0][(1.1)^0][1.10]), the second take-over probability can be 30.250 percent (i.e., [20.0+5.0][(1.1^1][1.10]), and the third take-over probability can be 33.275 percent (i.e., [20.0+5.0][(1.1^2][1.10]). Thus, for the first candidate route 120 the sum can be 81.9225 percent. For example, for the third candidate route 124, the first take-over probability can be 38.500 percent (i.e., [30.0+5.0][1.1^ ][1.10]) and the second take-over probability can be 36.300 percent (i.e., [25.0+5.0][(1.1^1][1.10]). Thus, for the third candidate route 124 the sum can be 70.9500 percent. For example, for the fourth candidate route 126, the first take-over probability can be 33.000 percent (i.e., [25.0+5.0][(1.1^0][1.10]) and the second take-over probability can be 42.350 percent (i.e., [30.0+5.0][(1.1^1][1.10]). Thus, for the fourth candidate route 126 the sum can be 71.1150 percent. Based on this data, the route selection module 214 can select the third candidate route 124 as the route from the origination to the destination because the third candidate route 124 can be least likely, from among the candidate routes, to cause the occupant to cause control of the autonomous vehicle to be transferred to the occupant.

In a version of the adaptation of the variation of the specific realization of the sixth implementation, the data store 204 can be further configured to store a situation weights. The route information module 210 can further includes instructions that function to control the processor 202 to obtain the situation weights. The situation weights can be measures of likelihoods that the encounters with the types of driving situations will result in collisions and severities of consequences in response to the encounters being the collisions. The situation weights can include a first situation weight and a second situation weight. The first type of driving situation can be associated with the first situation weight, and the second type of driving situation can be associated with the second situation weight. The first product can be of the first item of information multiplied by the first take-over probability multiplied by the first situation weight, and the second product can be of the second item of information multiplied by the second take-over probability multiplied by the second situation weight.

For example, for the first candidate route 120, the first product can be of the first item of information (e.g., an encounter probability with the first vehicle 132 (e.g., 90 percent)) multiplied by the first take-over probability (e.g., for an encounter with the first vehicle 132 (e.g., 27.500 percent)) multiplied by the first situation weight (e.g., 1.0), the second product can be of the second item of information (e.g., an encounter probability with the second vehicle 134 (e.g., 90 percent)) multiplied by the second take-over probability (e.g., for an encounter with the second vehicle 134 (e.g., 30.250 percent)) multiplied by the second situation weight (e.g., 1.0), and the third product can be of the third item of information (e.g., an encounter probability with the third vehicle 136 (e.g., 90 percent)) multiplied by the third take-over probability (e.g., for an encounter with the third vehicle 136 (e.g., 33.275 percent)) multiplied by the third situation weight (e.g., 1.0). Thus, the first candidate route 120 can have a score of 81.9225.

For example, for the third candidate route 124, the first product can be of the first item of information (e.g., an encounter probability with the first crosswalk 158 (e.g., 90 percent)) multiplied by the first take-over probability (e.g., for an encounter with the first crosswalk 158 (e.g., 38.500 percent)) multiplied by the first situation weight (e.g., 3.0) and the second product can be of the second item of information (e.g., an encounter probability with the first obstacle 150 (e.g., 100 percent)) multiplied by the second take-over probability (e.g., for an encounter with the first obstacle 150 (e.g., 36.300 percent)) multiplied by the second situation weight (e.g., 2.0). Thus, the third candidate route 124 can have a score of 176.5500.

For example, for the fourth candidate route 126, the first product can be of the first item of information (e.g., an encounter probability with the second obstacle 166 (e.g., 100 percent)) multiplied by the first take-over probability (e.g., for an encounter with the second obstacle 166 (e.g., 33.000 percent)) multiplied by the first situation weight (e.g., 2.0) and the second product can be of the second item of information (e.g., an encounter probability with the second crosswalk 168 (e.g., 90 percent)) multiplied by the second take-over probability (e.g., for an encounter with the second crosswalk 168 (e.g., 42.350 percent)) multiplied by the second situation weight (e.g., 3.0). Thus, the fourth candidate route 126 can have a score of 180.3450.

Based on this data, the route selection module 214 can select the first candidate route 120 as the route from the origination to the destination because the first candidate route 120 can be least likely, from among the candidate routes, to cause the occupant to cause control of the autonomous vehicle to be transferred to the occupant.

Figure 3:
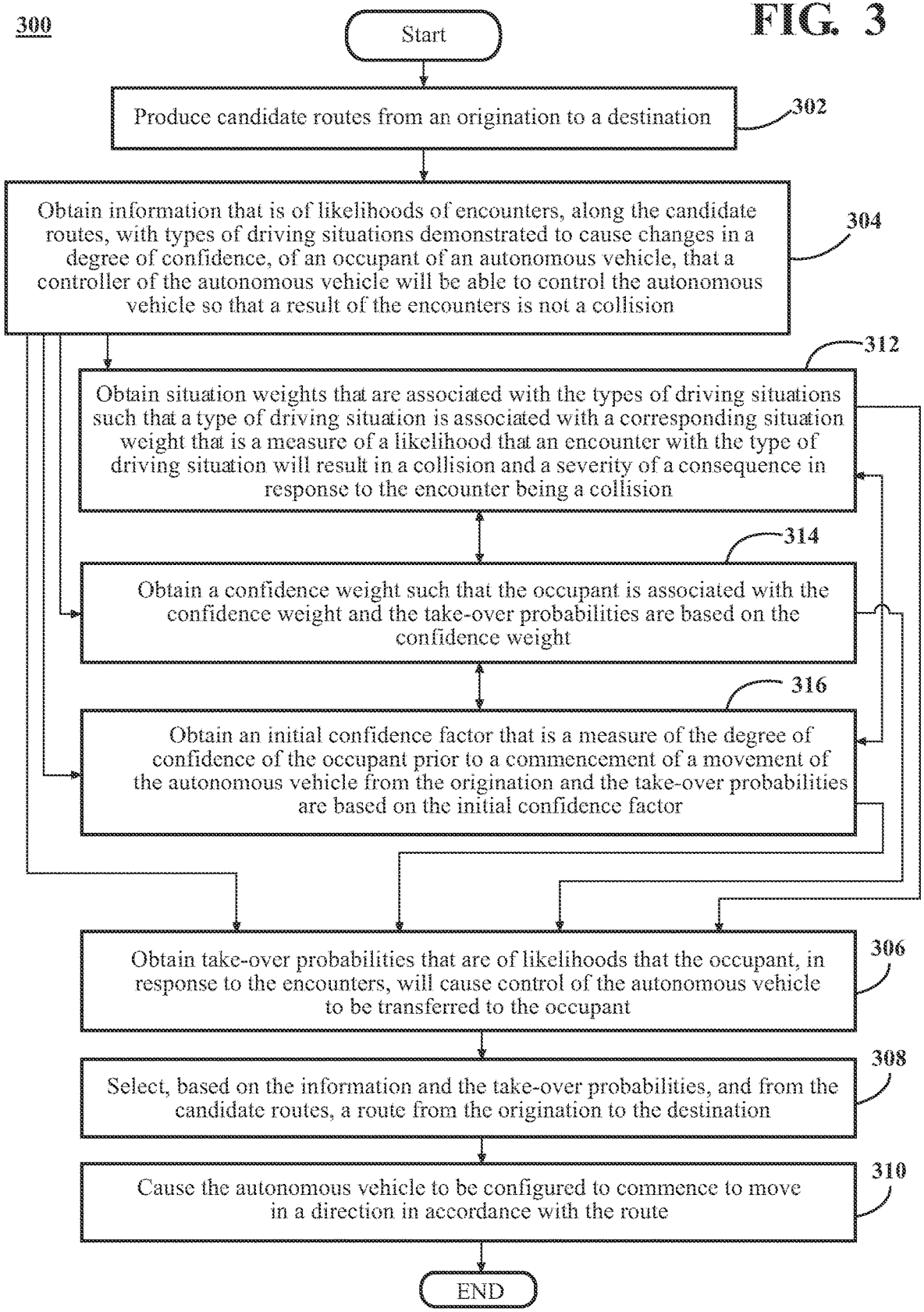
FIG. 3 includes a flow diagram that illustrates an example of a method that is associated with producing, for the autonomous vehicle, the route from the origination to the destination, according to the disclosed technologies.

FIG. 3 includes a flow diagram that illustrates an example of a method 300 that is associated with producing, for an autonomous vehicle, a route from an origination to a destination, according to the disclosed technologies. The method 300 is described from the perspective of the system 200 illustrated in FIG. 2. Although the method 300 is described in combination with the system 200, one of skill in the art understands, in light of the description herein, that the method 300 is not limited to being implemented by the system 200. Rather, the system 200 is an example of a system that may be used to implement the method 300.

In FIG. 3, in the method 300, at an operation 302, the candidate route producing module 208 can produce candidate routes from the origination to the destination. For example, the candidate route producing module 208 can produce the candidate routes so that a prospective candidate route is included in the candidate routes based on an ability of the autonomous vehicle to travel from the origination to the destination within a threshold duration of time.

At an operation 304, the route information module 210 can obtain information. The information can be of likelihoods of encounters, along the candidate routes, with types of driving situations demonstrated to cause changes in a degree of confidence, of an occupant of the autonomous vehicle, that a controller of the autonomous vehicle will be able to control the autonomous vehicle so that a result of the encounters is not a collision. For example, a type of driving situation, of the types of driving situations, can include a pedestrian in a lane of the autonomous vehicle, an obstacle in the lane of the autonomous vehicle, another vehicle being in a lane for a movement in an opposite direction of the direction of the lane of the autonomous vehicle, or the like. For example, the other vehicle can have a weight that is a multiple of at least ten times a weight of the autonomous vehicle. For example, the other vehicle can be a semi-tractor-trailer truck.

In a first implementation, the route information module 210 can obtain the information by receiving, via the wireless communications device 218, the information. For example, the route information module 210 can receive the information from one or more of another vehicle, a cloud computing platform, a roadside infrastructure unit, or the like.

In a second implementation, the route information module 210 can determine the information. The information can be encounter probabilities.

At an operation 306, the occupant information module 212 can obtain the take-over probabilities. The take-over probabilities can be of likelihoods that the occupant, in response to the encounters, will cause control of the autonomous vehicle to be transferred to the occupant. For example, the occupant information module 212 can determine the take-over probabilities from information produced from an analysis of historical data associated with previous encounters with the types of driving situations. For example, the historical data can be associated with one or more of a set of occupants or a set of autonomous vehicles.

At an operation 308, the route selection module 214 can select, based on the information and the take-over probabilities, and from the candidate routes, the route from the origination to the destination.

At an operation 310, the actuation module 216 can cause the autonomous vehicle to be configured to commence to move in a direction in accordance with the route. For example, the actuation module 216 can cause the autonomous vehicle to commence to move in the direction in accordance with the route.

In a third implementation, at an operation 312, the route information module 210 can obtain situation weights. A type of driving situation, of the types of driving situations, can be associated with a corresponding situation weight of the situation weights. The corresponding situation weight can be a measure of a likelihood that an encounter with the type of driving situation will result in the collision and a severity of a consequence in response to the encounter being the collision. At the operation 308, the route selection module 214 can select the route further based on the situation weights.

In a fourth implementation, at an operation 314, the occupant information module 212 can obtain a confidence weight. The occupant can be associated with the confidence weight. For example, the occupant information module 212 can obtain the confidence weight from information produced from an analysis of historical data associated with previous encounters, by the occupant, with the types of driving situations. The take-over probabilities, obtained by the occupant information module 212 at the operation 306, can be based on the confidence weight.

In a fifth implementation, at an operation 316, the occupant information module 212 can obtain an initial confidence factor. The initial confidence factor can be a measure of the degree of confidence of the occupant prior to a commencement of a movement of the autonomous vehicle from the origination. For example, the occupant information module 212 can obtain the initial confidence factor from one or more of: (1) information produced from processing an image of the occupant prior to the commencement of the movement of the autonomous vehicle from the origination, (2) information produced from an analysis of historical data associated with a count of a number of instances in which the occupant, in response to previous encounters with driving situations, caused control of the autonomous vehicle to be transferred to the occupant, (3) information produced from the analysis of the historical data between a time of the commencement of the movement of the autonomous vehicle from the origination and a threshold duration of time prior to the commencement of the movement of the autonomous vehicle from the origination, (4) information input, by the occupant, into an interface communicably coupled to the processor, or (5) the like. The take-over probabilities, obtained by the occupant information module 212 at the operation 306, can be based on the initial confidence factor.

In a sixth implementation, the information can include a first item of information and a second item of information, and the types of driving situations can include a first type of driving situation and a second type of driving situation. The first item of information can be of a likelihood of an encounter with the first type of driving situation, and the second item of information can be of a likelihood of an encounter with the second type of driving situation. The take-over probabilities can include a first take-over probability and a second take-over probability. The first take-over probability can be of a likelihood that the occupant, in response to the encounter with the first type of driving situation, will cause control of the autonomous vehicle to be transferred to the occupant. The second take-over probability can be of a likelihood that the occupant, in response to the encounter with the second type of driving situation, will cause control of the autonomous vehicle to be transferred to the occupant. At the operation 308, the route selection module 214 can select the route based on a sum of a first product added to a second product. The first product can be of the first item of information multiplied by the first take-over probability, and the second product can be of the second item of information multiplied by the second take-over probability.

In a specific realization of the sixth implementation, the first item of information can include information about a location of the first type of driving situation, and the second item of information can include information about a location of the second type of driving situation. Along a corresponding candidate route, of the candidate routes, the location of the first type of driving situation can be nearer to the origination than the location of the second type of driving situation. The second take-over probability can be a function of a sum of the encounters, along the corresponding candidate route, with the types of driving situations.

In a variation of the specific realization of the sixth implementation, at the operation 316, the occupant information module 212 can obtain an initial confidence factor. The initial confidence factor can be a measure of the degree of confidence of the occupant prior to a commencement of a movement of the autonomous vehicle from the origination. The take-over probabilities, obtained by the occupant information module 212 at the operation 306, can be based on the initial confidence factor.

In an adaptation of the variation of the specific realization of the sixth implementation, at the operation 314, the occupant information module 212 can obtain a confidence weight. The occupant can be associated with the confidence weight. The take-over probabilities, obtained by the occupant information module 212 at the operation 306, can be based on the confidence weight.

In a version of the adaptation of the variation of the specific realization of the sixth implementation, at the operation 312, the route information module 210 can obtain situation weights. The situation weights can be measures of likelihoods that the encounters with the types of driving situations will result in collisions and severities of consequences in response to the encounters being the collisions. The situation weights can include a first situation weight and a second situation weight. The first type of driving situation can be associated with the first situation weight, and the second type of driving situation can be associated with the second situation weight. The first product can be of the first item of information multiplied by the first take-over probability multiplied by the first situation weight, and the second product can be of the second item of information multiplied by the second take-over probability multiplied by the second situation weight.

Figure 4:
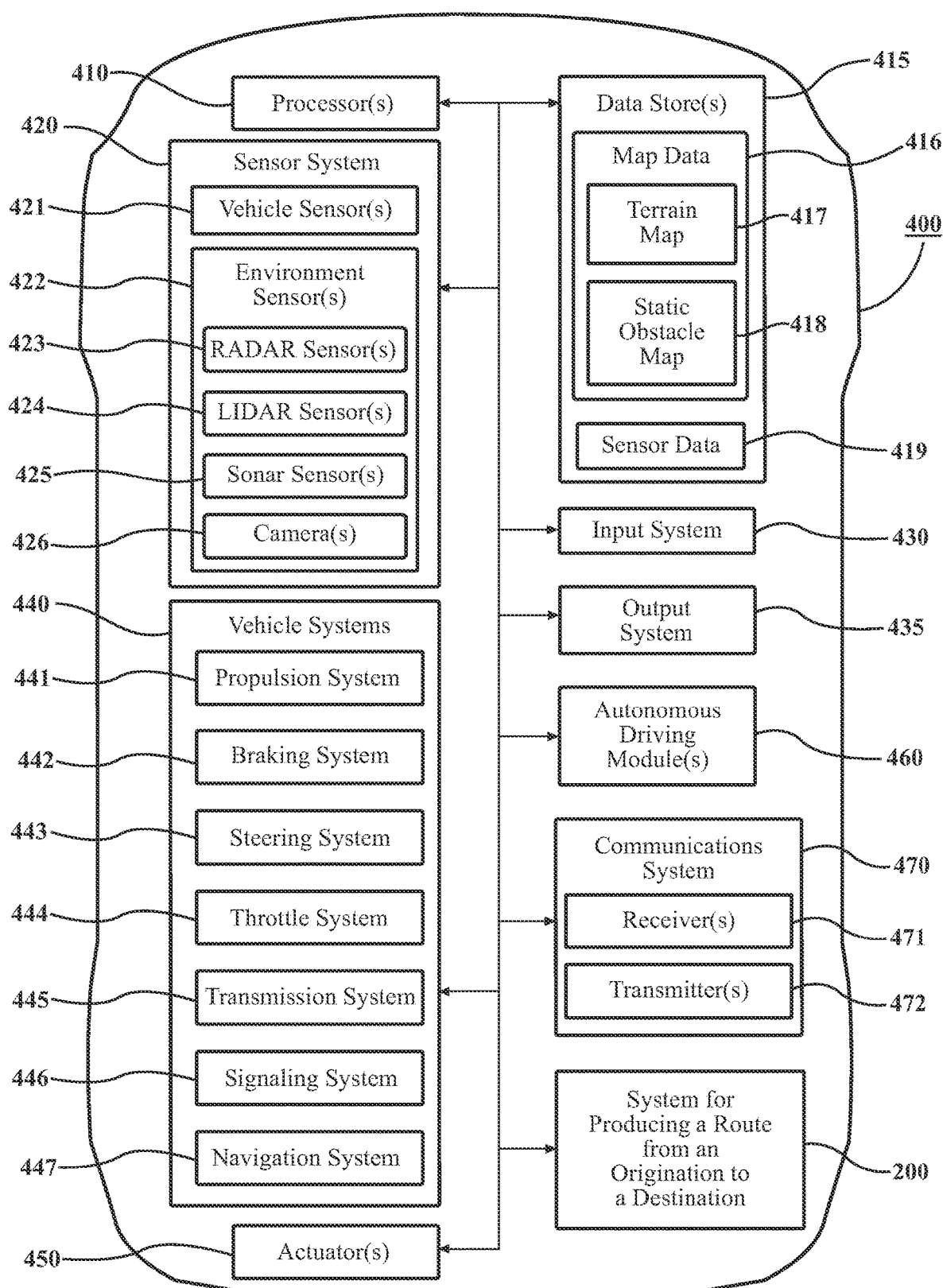
FIG. 4 includes a block diagram that illustrates an example of elements disposed on a vehicle, according to the disclosed technologies.

FIG. 4 includes a block diagram that illustrates an example of elements disposed on a vehicle 400, according to the disclosed technologies. As used herein, a "vehicle" can be any form of powered transport. In one or more implementations, the vehicle 400 can be an automobile. While arrangements described herein are with respect to automobiles, one of skill in the art understands, in light of the description herein, that embodiments are not limited to automobiles.

In some embodiments, the vehicle 400 can be configured to switch selectively between an automated mode, one or more semi-automated operational modes, and/or a manual mode. Such switching can be implemented in a suitable manner, now known or later developed. As used herein, "manual mode" can refer that all of or a majority of the navigation and/or maneuvering of the vehicle 400 is performed according to inputs received from a user (e.g., human driver). In one or more arrangements, the vehicle 400 can be a conventional vehicle that is configured to operate in only a manual mode.

In one or more embodiments, the vehicle 400 can be an automated vehicle. As used herein, "automated vehicle" can refer to a vehicle that operates in an automated mode. As used herein, "automated mode" can refer to navigating and/or maneuvering the vehicle 400 along a travel route using one or more computing systems to control the vehicle 400 with minimal or no input from a human driver. In one or more embodiments, the vehicle 400 can be highly automated or completely automated. In one embodiment, the vehicle 400 can be configured with one or more semi-automated operational modes in which one or more computing systems perform a portion of the navigation and/or maneuvering of the vehicle along a travel route, and a vehicle operator (i.e., driver) provides inputs to the vehicle 400 to perform a portion of the navigation and/or maneuvering of the vehicle 400 along a travel route.

The vehicle 400 can include various elements. The vehicle 400 can have any combination of the various elements illustrated in FIG. 4. In various embodiments, it may not be necessary for the vehicle 400 to include all of the elements illustrated in FIG. 4. Furthermore, the vehicle 400 can have elements in addition to those illustrated in FIG. 4. While the various elements are illustrated in FIG. 4 as being located within the vehicle 400, one or more of these elements can be located external to the vehicle 400. Furthermore, the elements illustrated may be physically separated by large distances. For example, as described, one or more components of the disclosed system can be implemented within the vehicle 400 while other components of the system can be implemented within a cloud-computing environment, as described below. For example, the elements can include one or more processors 410, one or more data stores 415, a sensor system 420, an input system 430, an output system 435, vehicle systems 440, one or more actuators 450, one or more automated driving modules 460, a communications system 470, and the system 200 for producing, for an autonomous vehicle, a route from an origination to a destination.

In one or more arrangements, the one or more processors 410 can be a main processor of the vehicle 400. For example, the one or more processors 410 can be an electronic control unit (ECU). For example, functions and/or operations of the processor 202 (illustrated in FIG. 2) can be realized by the one or more processors 410.

The one or more data stores 415 can store, for example, one or more types of data. For example, functions and/or operations of the data store 204 and the memory 206 (illustrated in FIG. 2) can be realized by the one or more data stores 415. The one or more data store 415 can include volatile memory and/or non-volatile memory. Examples of suitable memory for the one or more data stores 415 can include Random-Access Memory (RAM), flash memory, Read-Only Memory (ROM), Programmable Read-Only Memory (PROM), Erasable Programmable Read-Only Memory (EPROM), Electrically Erasable Programmable Read-Only Memory (EEPROM), registers, magnetic disks, optical disks, hard drives, any other suitable storage medium, or any combination thereof. The one or more data stores 415 can be a component of the one or more processors 410. Additionally or alternatively, the one or more data stores 415 can be operatively connected to the one or more processors 410 for use thereby. As used herein, "operatively connected" can include direct or indirect connections, including connections without direct physical contact. As used herein, a statement that a component can be "configured to" perform an operation can be understood to mean that the component requires no structural alterations, but merely needs to be placed into an operational state (e.g., be provided with electrical power, have an underlying operating system running, etc.) in order to perform the operation.

In one or more arrangements, the one or more data stores 415 can store map data 416. The map data 416 can include maps of one or more geographic areas. In some instances, the map data 416 can include information or data on roads, traffic control devices, road markings, structures, features, and/or landmarks in the one or more geographic areas. The map data 416 can be in any suitable form. In some instances, the map data 416 can include aerial views of an area. In some instances, the map data 416 can include ground views of an area, including 360-degree ground views. The map data 416 can include measurements, dimensions, distances, and/or information for one or more items included in the map data 416 and/or relative to other items included in the map data 416. The map data 416 can include a digital map with information about road geometry. The map data 416 can be high quality and/or highly detailed.

In one or more arrangements, the map data 416 can include one or more terrain maps 417. The one or more terrain maps 417 can include information about the ground, terrain, roads, surfaces, and/or other features of one or more geographic areas. The one or more terrain maps 417 can include elevation data of the one or more geographic areas. The map data 416 can be high quality and/or highly detailed. The one or more terrain maps 417 can define one or more ground surfaces, which can include paved roads, unpaved roads, land, and other things that define a ground surface.

In one or more arrangements, the map data 416 can include one or more static obstacle maps 418. The one or more static obstacle maps 418 can include information about one or more static obstacles located within one or more geographic areas. A "static obstacle" can be a physical object whose position does not change (or does not substantially change) over a period of time and/or whose size does not change (or does not substantially change) over a period of time. Examples of static obstacles can include trees, buildings, curbs, fences, railings, medians, utility poles, statues, monuments, signs, benches, furniture, mailboxes, large rocks, and hills. The static obstacles can be objects that extend above ground level. The one or more static obstacles included in the one or more static obstacle maps 418 can have location data, size data, dimension data, material data, and/or other data associated with them. The one or more static obstacle maps 418 can include measurements, dimensions, distances, and/or information for one or more static obstacles. The one or more static obstacle maps 418 can be high quality and/or highly detailed. The one or more static obstacle maps 418 can be updated to reflect changes within a mapped area.

In one or more arrangements, the one or more data stores 415 can store sensor data 419. As used herein, "sensor data" can refer to any information about the sensors with which the vehicle 400 can be equipped including the capabilities of and other information about such sensors. The sensor data 419 can relate to one or more sensors of the sensor system 420. For example, in one or more arrangements, the sensor data 419 can include information about one or more lidar sensors 424 of the sensor system 420.

In some arrangements, at least a portion of the map data 416 and/or the sensor data 419 can be located in one or more data stores 415 that are located onboard the vehicle 400. Alternatively or additionally, at least a portion of the map data 416 and/or the sensor data 419 can be located in one or more data stores 415 that are located remotely from the vehicle 400.

The sensor system 420 can include one or more sensors. As used herein, a "sensor" can refer to any device, component, and/or system that can detect and/or sense something. The one or more sensors can be configured to detect and/or sense in real-time. As used herein, the term "real-time" can refer to a level of processing responsiveness that is perceived by a user or system to be sufficiently immediate for a particular process or determination to be made, or that enables the processor to keep pace with some external process.

In arrangements in which the sensor system 420 includes a plurality of sensors, the sensors can work independently from each other. Alternatively, two or more of the sensors can work in combination with each other. In such a case, the two or more sensors can form a sensor network. The sensor system 420 and/or the one or more sensors can be operatively connected to the one or more processors 410, the one or more data stores 415, and/or another element of the vehicle 400 (including any of the elements illustrated in FIG. 4). The sensor system 420 can acquire data of at least a portion of the external environment of the vehicle 400 (e.g., nearby vehicles). The sensor system 420 can include any suitable type of sensor. Various examples of different types of sensors are described herein. However, one of skill in the art understands that the embodiments are not limited to the particular sensors described herein.

The sensor system 420 can include one or more vehicle sensors 421. The one or more vehicle sensors 421 can detect, determine, and/or sense information about the vehicle 400 itself. In one or more arrangements, the one or more vehicle sensors 421 can be configured to detect and/or sense position and orientation changes of the vehicle 400 such as, for example, based on inertial acceleration. In one or more arrangements, the one or more vehicle sensors 421 can include one or more accelerometers, one or more gyroscopes, an inertial measurement unit (IMU), a dead-reckoning system, a global navigation satellite system (GNSS), a global positioning system (GPS), a navigation system 447, and/or other suitable sensors. The one or more vehicle sensors 421 can be configured to detect and/or sense one or more characteristics of the vehicle 400. In one or more arrangements, the one or more vehicle sensors 421 can include a speedometer to determine a current speed of the vehicle 400.

Alternatively or additionally, the sensor system 420 can include one or more environment sensors 422 configured to acquire and/or sense driving environment data. As used herein, "driving environment data" can include data or information about the external environment in which a vehicle is located or one or more portions thereof. For example, the one or more environment sensors 422 can be configured to detect, quantify, and/or sense obstacles in at least a portion of the external environment of the vehicle 400 and/or information/data about such obstacles. Such obstacles may be stationary objects and/or dynamic objects. The one or more environment sensors 422 can be configured to detect, measure, quantify, and/or sense other things in the external environment of the vehicle 400 such as, for example, lane markers, signs, traffic lights, traffic signs, lane lines, crosswalks, curbs proximate the vehicle 400, off-road objects, etc.

Various examples of sensors of the sensor system 420 are described herein. The example sensors may be part of the one or more vehicle sensors 421 and/or the one or more environment sensors 422. However, one of skill in the art understands that the embodiments are not limited to the particular sensors described.

In one or more arrangement, the one or more environment sensors 422 can include one or more radar sensors 423, one or more lidar sensors 424, one or more sonar sensors 425, and/or one more cameras 426. In one or more arrangements, the one or more cameras 426 can be one or more high dynamic range (HDR) cameras or one or more infrared (IR) cameras. For example, the one or more cameras 426 can be used to record a reality of a state of an item of information that can appear in digital map.

The input system 430 can include any device, component, system, element, arrangement, or groups thereof that enable information/data to be entered into a machine. The input system 430 can receive an input from a vehicle passenger (e.g., a driver or a passenger). The output system 435 can include any device, component, system, element, arrangement, or groups thereof that enable information/data to be presented to a vehicle passenger (e.g., a driver or a passenger).

Various examples of the one or more vehicle systems 440 are illustrated in FIG. 4. However, one of skill in the art understands that the vehicle 400 can include more, fewer, or different vehicle systems. Although particular vehicle systems can be separately defined, each or any of the systems or portions thereof may be otherwise combined or segregated via hardware and/or software within the vehicle 400. For example, the one or more vehicle systems 440 can include a propulsion system 441, a braking system 442, a steering system 443, a throttle system 444, a transmission system 445, a signaling system 446, and/or the navigation system 447. Each of these systems can include one or more devices, components, and/or a combination thereof, now known or later developed.

The navigation system 447 can include one or more devices, applications, and/or combinations thereof, now known or later developed, configured to determine the geographic location of the vehicle 400 and/or to determine a travel route for the vehicle 400. The navigation system 447 can include one or more mapping applications to determine a travel route for the vehicle 400. The navigation system 447 can include a global positioning system, a local positioning system, a geolocation system, and/or a combination thereof.

The one or more actuators 450 can be any element or combination of elements operable to modify, adjust, and/or alter one or more of the vehicle systems 440 or components thereof responsive to receiving signals or other inputs from the one or more processors 410 and/or the one or more automated driving modules 460. Any suitable actuator can be used. For example, the one or more actuators 450 can include motors, pneumatic actuators, hydraulic pistons, relays, solenoids, and/or piezoelectric actuators.

The one or more processors 410 and/or the one or more automated driving modules 460 can be operatively connected to communicate with the various vehicle systems 440 and/or individual components thereof. For example, the one or more processors 410 and/or the one or more automated driving modules 460 can be in communication to send and/or receive information from the various vehicle systems 440 to control the movement, speed, maneuvering, heading, direction, etc. of the vehicle 400. The one or more processors 410 and/or the one or more automated driving modules 460 may control some or all of these vehicle systems 440 and, thus, may be partially or fully automated.

The one or more processors 410 and/or the one or more automated driving modules 460 may be operable to control the navigation and/or maneuvering of the vehicle 400 by controlling one or more of the vehicle systems 440 and/or components thereof. For example, when operating in an automated mode, the one or more processors 410 and/or the one or more automated driving modules 460 can control the direction and/or speed of the vehicle 400. The one or more processors 410 and/or the one or more automated driving modules 460 can cause the vehicle 400 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" can mean to make, force, compel, direct, command, instruct, and/or enable an event or action to occur or at least be in a state where such event or action may occur, either in a direct or indirect manner.

The communications system 470 can include one or more receivers 471 and/or one or more transmitters 472. The communications system 470 can receive and transmit one or more messages through one or more wireless communications channels. For example, functions and/or operations of the wireless communications device 218 (illustrated in FIG. 2) can be realized by the communications system 470. For example, the one or more wireless communications channels can be in accordance with the Institute of Electrical and Electronics Engineers (IEEE) 802.11p standard to add wireless access in vehicular environments (WAVE) (the basis for Dedicated Short-Range Communications (DSRC)), the 3rd Generation Partnership Project (3GPP) Long-Term Evolution (LTE) Vehicle-to-Everything (V2X) (LTE-V2X) standard (including the LTE Uu interface between a mobile communication device and an Evolved Node B of the Universal Mobile Telecommunications System), the 3GPP fifth generation (5G) New Radio (NR) Vehicle-to-Everything (V2X) standard (including the 5G NR Uu interface), or the like. For example, the communications system 870 can include "connected car" technology. "Connected car" technology can include, for example, devices to exchange communications between a vehicle and other devices in a packet-switched network. Such other devices can include, for example, another vehicle (e.g., "Vehicle to Vehicle" (V2V) technology), roadside infrastructure (e.g., "Vehicle to Infrastructure" (V2I) technology), a cloud platform (e.g., "Vehicle to Cloud" (V2C) technology), a pedestrian (e.g., "Vehicle to Pedestrian" (V2P) technology), or a network (e.g., "Vehicle to Network" (V2N) technology. "Vehicle to Everything" (V2X) technology can integrate aspects of these individual communications technologies.

The vehicle 400 can include one or more modules, at least some of which are described herein. The modules can be implemented as computer-readable program code that, when executed by the one or more processors 410, implement one or more of the various processes described herein. One or more of the modules can be a component of the one or more processors 410. Alternatively or additionally, one or more of the modules can be executed on and/or distributed among other processing systems to which the one or more processors 410 can be operatively connected. The modules can include instructions (e.g., program logic) executable by the one or more processors 410. Alternatively or additionally, the one or more data store 415 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 400 can include one or more automated driving modules 460. The one or more automated driving modules 460 can be configured to receive data from the sensor system 420 and/or any other type of system capable of capturing information relating to the vehicle 400 and/or the external environment of the vehicle 400. In one or more arrangements, the one or more automated driving modules 460 can use such data to generate one or more driving scene models. The one or more automated driving modules 460 can determine position and velocity of the vehicle 400. The one or more automated driving modules 460 can determine the location of obstacles, obstacles, or other environmental features including traffic signs, trees, shrubs, neighboring vehicles, pedestrians, etc.

The one or more automated driving modules 460 can be configured to receive and/or determine location information for obstacles within the external environment of the vehicle 400 for use by the one or more processors 410 and/or one or more of the modules described herein to estimate position and orientation of the vehicle 400, vehicle position in global coordinates based on signals from a plurality of satellites, or any other data and/or signals that could be used to determine the current state of the vehicle 400 or determine the position of the vehicle 400 with respect to its environment for use in either creating a map or determining the position of the vehicle 400 in respect to map data.

The one or more automated driving modules 460 can be configured to determine one or more travel paths, current automated driving maneuvers for the vehicle 400, future automated driving maneuvers and/or modifications to current automated driving maneuvers based on data acquired by the sensor system 420, driving scene models, and/or data from any other suitable source such as determinations from the sensor data 419. As used herein, "driving maneuver" can refer to one or more actions that affect the movement of a vehicle. Examples of driving maneuvers include: accelerating, decelerating, braking, turning, moving in a lateral direction of the vehicle 400, changing travel lanes, merging into a travel lane, and/or reversing, just to name a few possibilities. The one or more automated driving modules 460 can be configured to implement determined driving maneuvers. The one or more automated driving modules 460 can cause, directly or indirectly, such automated driving maneuvers to be implemented. As used herein, "cause" or "causing" means to make, command, instruct, and/or enable an event or action to occur or at least be in a state where such event or action may occur, either in a direct or indirect manner. The one or more automated driving modules 460 can be configured to execute various vehicle functions and/or to transmit data to, receive data from, interact with, and/or control the vehicle 400 or one or more systems thereof (e.g., one or more of vehicle systems 440). For example, functions and/or operations of an automotive navigation system can be realized by the one or more automated driving modules 460.

Detailed embodiments are disclosed herein. However, one of skill in the art understands, in light of the description herein, that the disclosed embodiments are intended only as examples. Therefore, specific structural and functional details disclosed herein are not to be interpreted as limiting, but merely as a basis for the claims and as a representative basis for teaching one of skill in the art to variously employ the aspects herein in virtually any appropriately detailed structure. Furthermore, the terms and phrases used herein are not intended to be limiting but rather to provide an understandable description of possible implementations. Various embodiments are illustrated in FIGS. 1-4, but the embodiments are not limited to the illustrated structure or application.

The flowchart and block diagrams in the figures illustrate the architecture, functionality, and operation of possible implementations of systems, methods, and computer program products according to various embodiments. In this regard, each block in flowcharts or block diagrams may represent a module, segment, or portion of code, which comprises one or more executable instructions for implementing the specified logical function(s). One of skill in the art understands, in light of the description herein, that, in some alternative implementations, the functions described in a block may occur out of the order depicted by the figures. For example, two blocks depicted in succession may, in fact, be executed substantially concurrently, or the blocks may be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suitable. A typical combination of hardware and software can be a processing system with computer-readable program code that, when loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product that comprises all the features enabling the implementation of the methods described herein and that, when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. As used herein, the phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples of the computer-readable storage medium would include, in a non-exhaustive list, the following: a portable computer diskette, a hard disk drive (HDD), a solid-state drive (SSD), a read-only memory (ROM), an erasable programmable read-only memory (EPROM or flash memory), a portable compact disc read-only memory (CD-ROM), a digital versatile disc (DVD), an optical storage device, a magnetic storage device, or any suitable combination of the foregoing. As used herein, a computer-readable storage medium may be any tangible medium that can contain or store a program for use by or in connection with an instruction execution system, apparatus, or device.

Generally, modules, as used herein, include routines, programs, objects, components, data structures, and so on that perform particular tasks or implement particular data types. In further aspects, a memory generally stores such modules. The memory associated with a module may be a buffer or may be cache embedded within a processor, a random-access memory (RAM), a ROM, a flash memory, or another suitable electronic storage medium. In still further aspects, a module as used herein, may be implemented as an application-specific integrated circuit (ASIC), a hardware component of a system on a chip (SoC), a programmable logic array (PLA), or another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the disclosed technologies may be written in any combination of one or more programming languages, including an object-oriented programming language such as Java™, Smalltalk, C++, or the like, and conventional procedural programming languages such as the "C" programming language or similar programming languages. The program code may execute entirely on a user's computer, partly on a user's computer, as a stand-alone software package, partly on a user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . or . . . " as used herein refers to and encompasses any and all possible combinations of one or more of the associated listed items. For example, the phrase "at least one of A, B, or C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system for producing, for an autonomous vehicle, a route from an origination to a destination, the system comprising:
    one or more processors;
    a data store communicably coupled to the one or more processors and configured to store encounter information, a confidence weight, and take-over probabilities; and
    a memory communicably coupled to the one or more processors and storing:
        a candidate route producing module including instructions that when executed by the one or more processors cause the one or more processors to produce candidate routes from the origination to the destination;
        a route information module including instructions that when executed by the one or more processors cause the one or more processors to obtain the encounter information, the encounter information being of likelihoods of encounters, along the candidate routes, with types of driving situations demonstrated to cause changes in a degree of confidence, of an occupant of the autonomous vehicle, that a controller of the autonomous vehicle will be able to control the autonomous vehicle so that a result of the encounters is not a collision;
        an occupant information module including instructions that when executed by the one or more processors cause the one or more processors to obtain the confidence weight and the take-over probabilities, the occupant being associated with the confidence weight, the take-over probabilities being based on the confidence weight and being of likelihoods that the occupant, in response to the encounters, will cause control of the autonomous vehicle to be transferred to the occupant;
        a route selection module including instructions that when executed by the one or more processors cause the one or more processors to select, based on the encounter information and the take-over probabilities, and from the candidate routes, the route from the origination to the destination; and
        an actuation module including instructions that when executed by the one or more processors cause the one or more processors to cause the autonomous vehicle to be configured to commence to move in a direction in accordance with the route.

2. The system of claim 1, wherein the instructions to obtain the encounter information include instructions that cause the one or more processors to receive, via a wireless communications device communicably coupled to the one or more processors, the encounter information.

3. The system of claim 2, wherein the instructions to receive the encounter information include instructions that cause the one or more processors to receive the encounter information from at least one of another vehicle, a cloud computing platform, or a roadside infrastructure unit.

4. The system of claim 1, wherein the instructions to obtain the encounter information include instructions that cause the one or more processors to determine the encounter information, the encounter information being encounter probabilities.

5. The system of claim 1, wherein the instructions to obtain the take-over probabilities include instructions that cause the one or more processors to determine the take-over probabilities from information produced from an analysis of historical data associated with previous encounters with the types of driving situations, the historical data associated with at least one of a set of occupants or a set of autonomous vehicles.

6. The system of claim 1, wherein:
the data store is further configured to store situation weights,
the route information module further includes instructions that when executed by the one or more processors cause the one or more processors to obtain the situation weights,
a type of driving situation, of the types of driving situations, is associated with a corresponding situation weight of the situation weights, the corresponding situation weight being a measure of a likelihood that an encounter with the type of driving situation will result in the collision and a severity of a consequence in response to the encounter being the collision, and
the instructions to select the route include instructions that cause the one or more processors to select the route further based on the situation weights.

7. The system of claim 1, wherein the instructions to obtain the confidence weight include instructions that cause the one or more processors to obtain the confidence weight from information produced from an analysis of historical data associated with previous encounters, by the occupant, with the types of driving situations.

8. The system of claim 1, wherein:
the data store is further configured to store an initial confidence factor,
the occupant information module further includes instructions that when executed by the one or more processors cause the one or more processors to obtain the initial confidence factor, the initial confidence factor being a measure of the degree of confidence of the occupant prior to a commencement of a movement of the autonomous vehicle from the origination, and
the take-over probabilities are based on the initial confidence factor.

9. The system of claim 8, wherein the instructions to obtain the initial confidence factor include instructions that cause the one or more processors to obtain the initial confidence factor from at least one of:
information produced from processing an image of the occupant prior to the commencement of the movement of the autonomous vehicle from the origination,
information produced from an analysis of historical data associated with a count of a number of instances in which the occupant, in response to previous encounters with driving situations, caused control of the autonomous vehicle to be transferred to the occupant,
information produced from the analysis of the historical data between a time of the commencement of the movement of the autonomous vehicle from the origination and a threshold duration of time prior to the commencement of the movement of the autonomous vehicle from the origination, or
information input, by the occupant, into an interface communicably coupled to the one or more processors.

10. The system of claim 1, wherein:
the encounter information comprises a first item of encounter information and a second item of encounter information,
the types of driving situations comprise a first type of driving situation and a second type of driving situation,
the first item of encounter information is of a likelihood of an encounter with the first type of driving situation,
the second item of encounter information is of a likelihood of an encounter with the second type of driving situation,
the take-over probabilities comprise a first take-over probability and a second take-over probability,
the first take-over probability is of a likelihood that the occupant, in response to the encounter with the first type of driving situation, will cause control of the autonomous vehicle to be transferred to the occupant,
the second take-over probability is of a likelihood that the occupant, in response to the encounter with the second type of driving situation, will cause control of the autonomous vehicle to be transferred to the occupant, and
the instructions to select the route include instructions that cause the one or more processors to select the route based on a sum of a first product added to a second product, the first product being of the first item of encounter information multiplied by the first take-over probability, and the second product being of the second item of encounter information multiplied by the second take-over probability.

11. The system of claim 10, wherein:
the first item of encounter information includes information about a location of the first type of driving situation,
the second item of encounter information includes information about a location of the second type of driving situation,
along a corresponding candidate route, of the candidate routes, the location of the first type of driving situation is nearer to the origination than the location of the second type of driving situation, and
the second take-over probability is a function of a sum of the encounters, along the corresponding candidate route, with the types of driving situations.

12. The system of claim 11, wherein:
the data store is further configured to store an initial confidence factor,
the occupant information module further includes instructions that when executed by the one or more processors cause the one or more processors to obtain the initial confidence factor, the initial confidence factor being a measure of the degree of confidence of the occupant prior to a commencement of a movement of the autonomous vehicle from the origination, and
the take-over probabilities are based on the initial confidence factor.

13. The system of claim 12, wherein:
the data store is further configured to store situation weights,
the route information module further includes instructions that when executed by the one or more processors cause the one or more processors to obtain the situation weights, the situation weights being measures of likelihoods that the encounters with the types of driving situations will result in collisions and severities of consequences in response to the encounters being the collisions, the situation weights comprise a first situation weight and a second situation weight, the first type of driving situation is associated with the first situation weight, the second type of driving situation is associated with the second situation weight, the first product is of the first item of encounter information multiplied by the first take-over probability multiplied by the first situation weight, and the second product is of the second item of encounter information multiplied by the second take-over probability multiplied by the second situation weight.

14. A method for producing, for an autonomous vehicle, a route from an origination to a destination, the method comprising:

producing, by a processor, candidate routes from the origination to the destination;

obtaining, by the processor, encounter information, the encounter information being of likelihoods of encounters, along the candidate routes, with types of driving situations demonstrated to cause changes in a degree of confidence, of an occupant of the autonomous vehicle, that a controller of the autonomous vehicle will be able to control the autonomous vehicle so that a result of the encounters is not a collision;

obtaining, by the processor, a confidence weight and take-over probabilities, the occupant being associated with the confidence weight, the take-over probabilities being based on the confidence weight and being of likelihoods that the occupant, in response to the encounters, will cause control of the autonomous vehicle to be transferred to the occupant;

selecting, by the processor, based on the encounter information and the take-over probabilities, and from the candidate routes, the route from the origination to the destination; and causing, by the processor, the autonomous vehicle to be configured to commence to move in a direction in accordance with the route.

15. The method of claim 14, wherein the producing the candidate routes comprises producing the candidate routes so that a prospective candidate route is included in the candidate routes based on an ability of the autonomous vehicle to travel from the origination to the destination within a threshold duration of time.

16. The method of claim 14, wherein a type of driving situation, of the types of driving situations, comprises a pedestrian in a lane of the autonomous vehicle, an obstacle in the lane of the autonomous vehicle, or another vehicle being in a lane for a movement in an opposite direction of the direction of the lane of the autonomous vehicle, the other vehicle having a weight that is a multiple of at least ten times a weight of the autonomous vehicle.

17. The method of claim 14, wherein the causing the autonomous vehicle to be configured to commence to move in the direction in accordance with the route comprises causing the autonomous vehicle to commence to move in the direction in accordance with the route.

18. A non-transitory computer-readable medium for producing, for an autonomous vehicle, a route from an origination to a destination, the non-transitory computer-readable medium including instructions that when executed by one or more processors cause the one or more processors to:

produce candidate routes from the origination to the destination;

obtain encounter information, the encounter information being of likelihoods of encounters, along the candidate routes, with types of driving situations demonstrated to cause changes in a degree of confidence, of an occupant of the autonomous vehicle, that a controller of the autonomous vehicle will be able to control the autonomous vehicle so that a result of the encounters is not a collision;

obtain a confidence weight and take-over probabilities, the occupant being associated with the confidence weight, the take-over probabilities being based on the confidence weight and being of likelihoods that the occupant, in response to the encounters, will cause control of the autonomous vehicle to be transferred to the occupant;

select, based on the encounter information and the take-over probabilities, and from the candidate routes, the route from the origination to the destination; and cause the autonomous vehicle to be configured to commence to move in a direction in accordance with the route.

19. The system of claim 1, wherein the instructions to produce the candidate routes include instructions to produce the candidate routes so that a prospective candidate route is included in the candidate routes based on an ability of the autonomous vehicle to travel from the origination to the destination within a threshold duration of time.

20. The system of claim 1, wherein a type of driving situation, of the types of driving situations, comprises a pedestrian in a lane of the autonomous vehicle, an obstacle in the lane of the autonomous vehicle, or another vehicle being in a lane for a movement in an opposite direction of the direction of the lane of the autonomous vehicle, the other vehicle having a weight that is a multiple of at least ten times a weight of the autonomous vehicle.

* * * * *